July 28, 1931.  H. F. HITNER  1,815,977
APPARATUS FOR MAKING GLASS
Filed May 23, 1927    6 Sheets-Sheet 1

INVENTOR
Harry F. Hitner
by
James C. Bradley
Atty

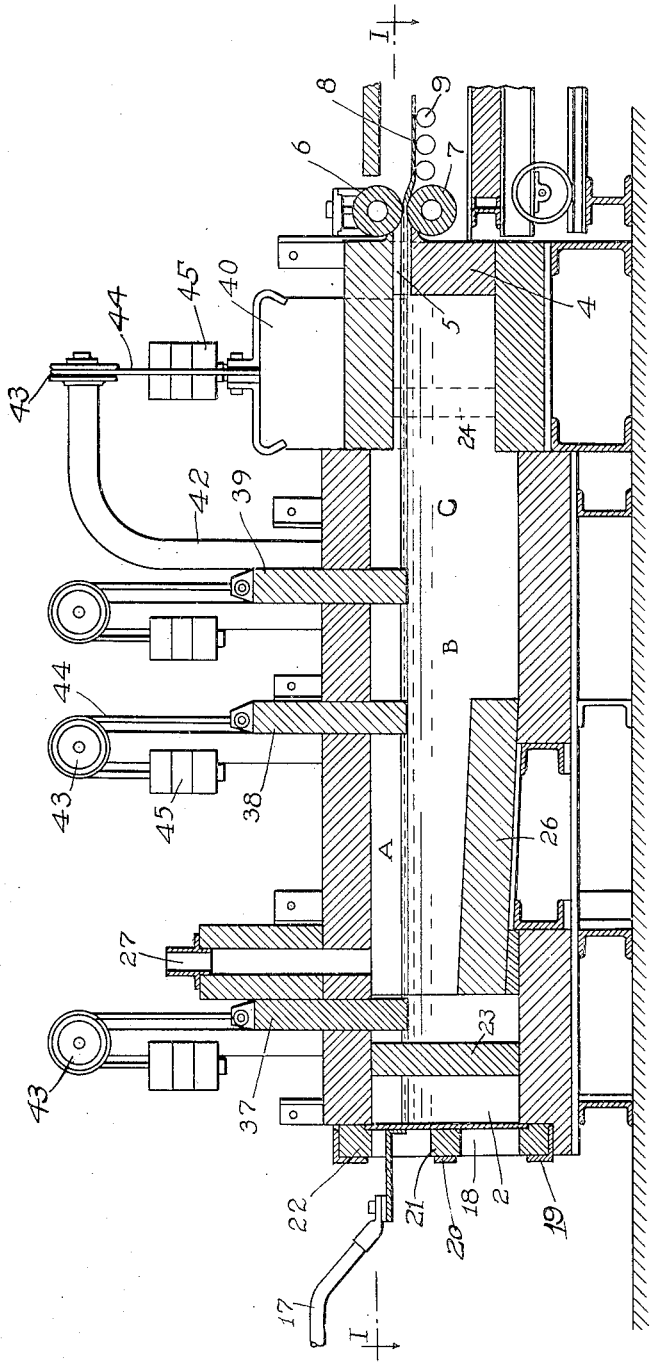

July 28, 1931. H. F. HITNER 1,815,977
APPARATUS FOR MAKING GLASS
Filed May 23, 1927 6 Sheets-Sheet 3
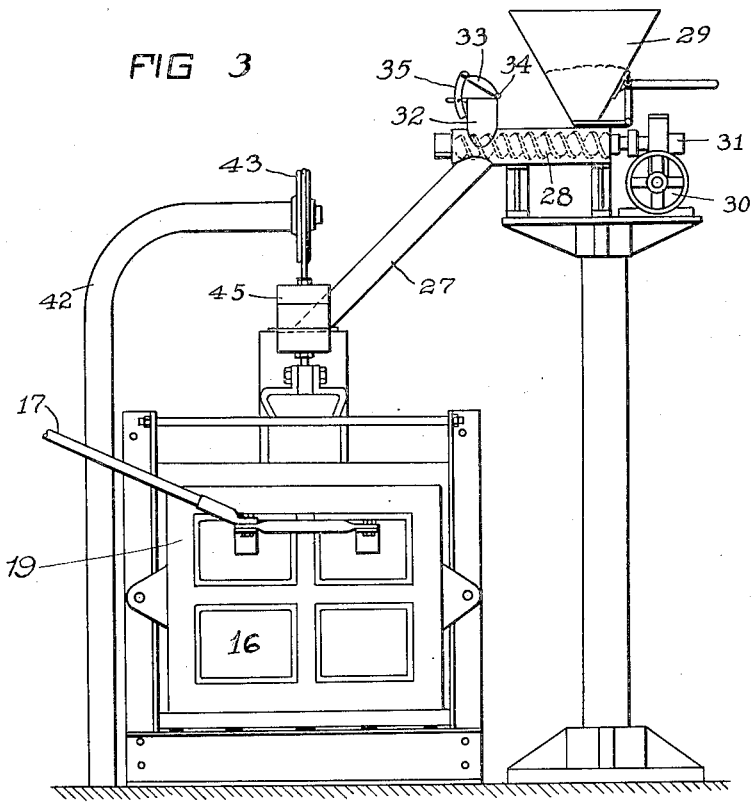
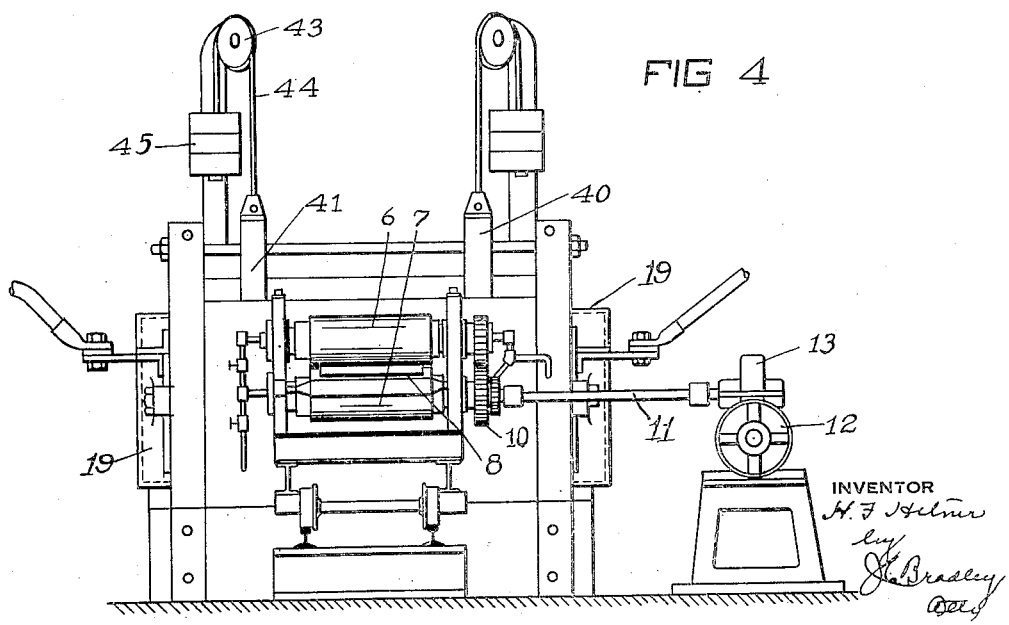

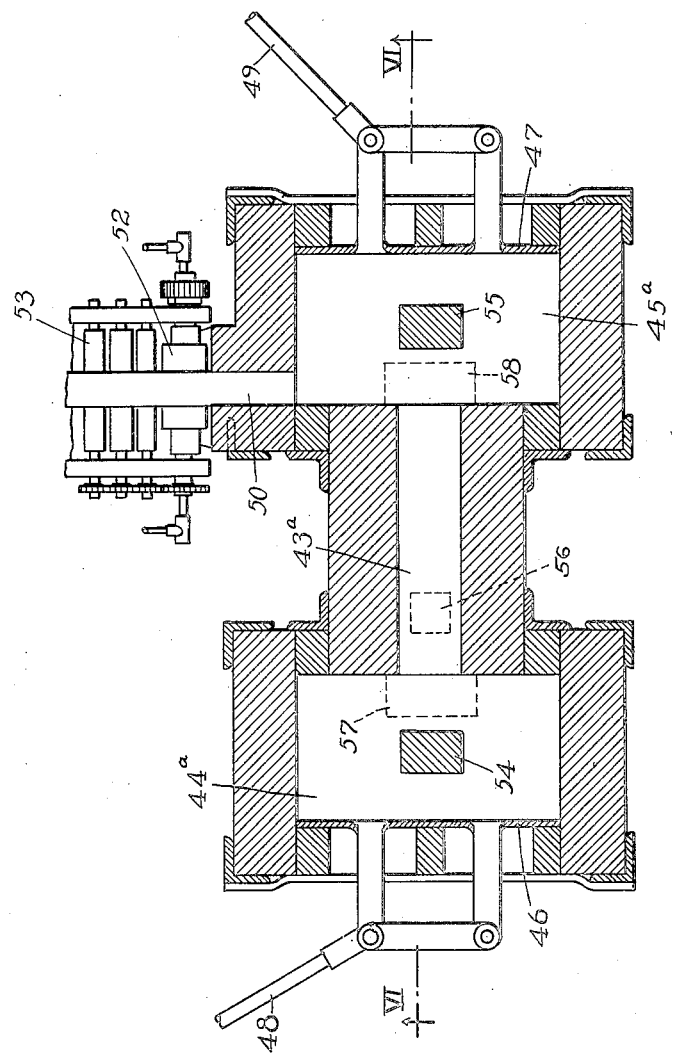

July 28, 1931.   H. F. HITNER   1,815,977
APPARATUS FOR MAKING GLASS
Filed May 23, 1927    6 Sheets-Sheet 5

INVENTOR
Harry F. Hitner
by
James C. Bradley
Atty.

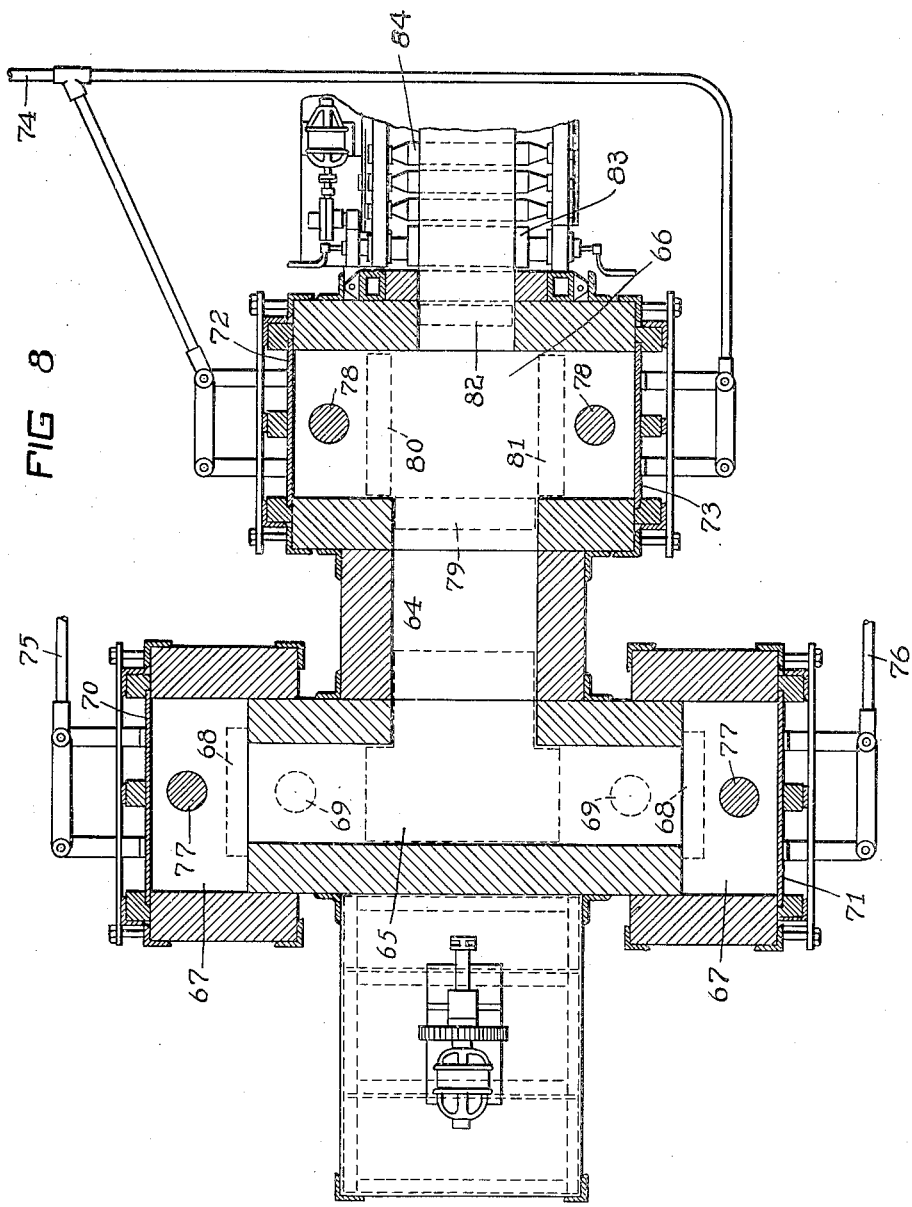

Patented July 28, 1931

1,815,977

UNITED STATES PATENT OFFICE

HARRY F. HITNER, OF OAKMONT, PENNSYLVANIA, ASSIGNOR TO PITTSBURGH PLATE GLASS COMPANY, A CORPORATION OF PENNSYLVANIA

APPARATUS FOR MAKING GLASS

Application filed May 23, 1927. Serial No. 193,404.

Figure 1:
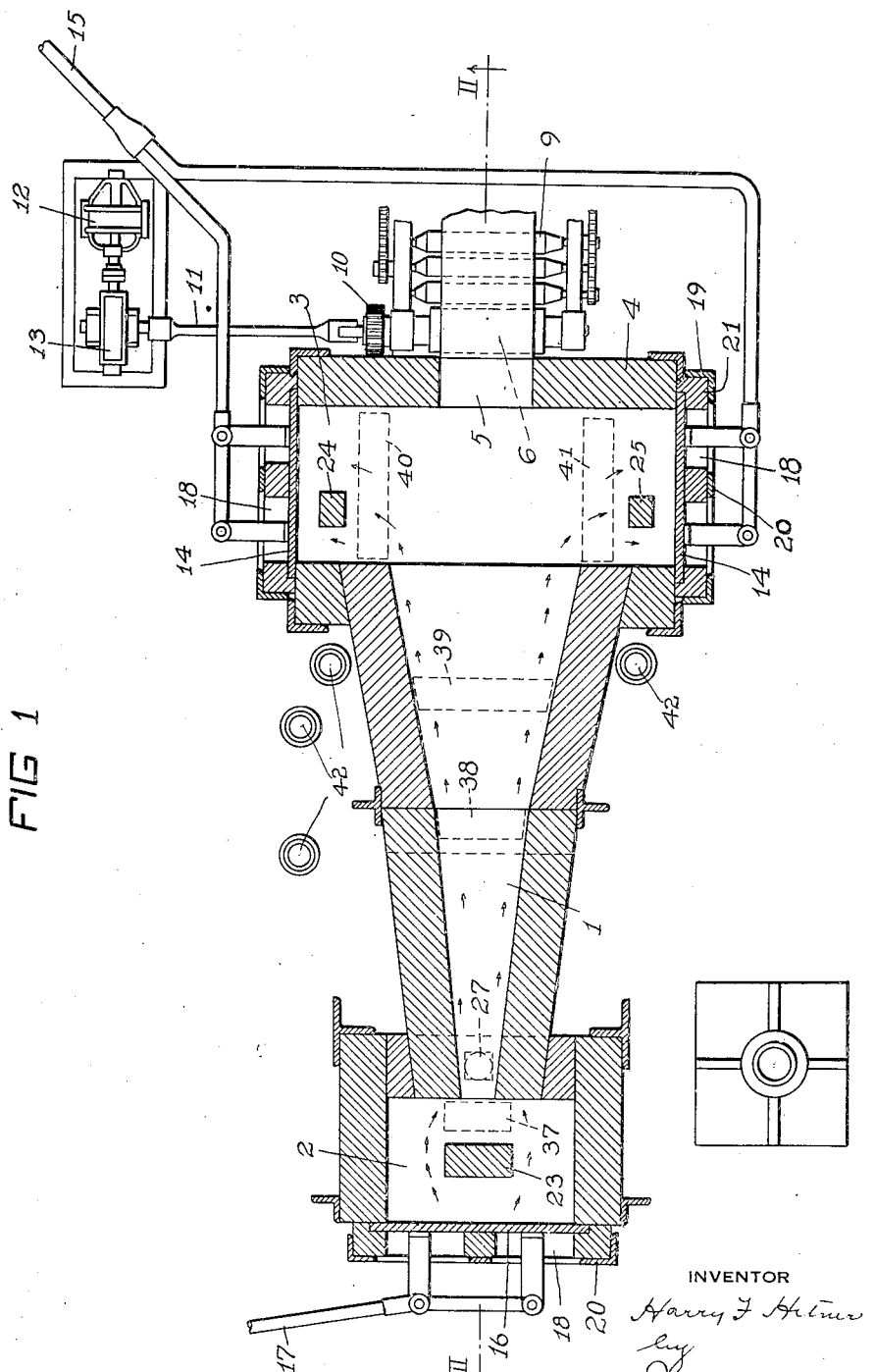
Figure 6:
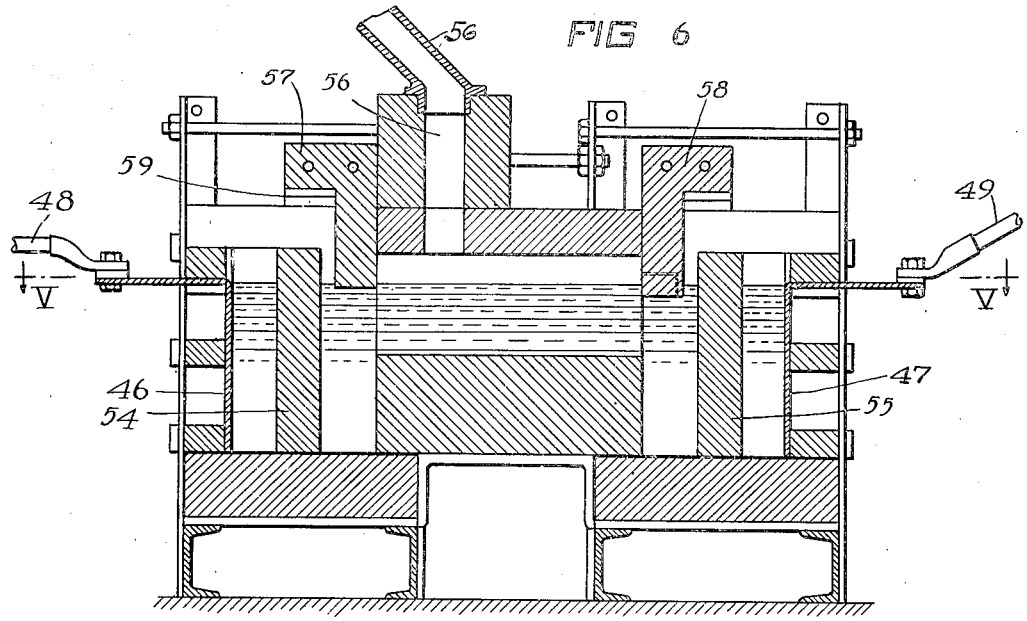
Figure 7:
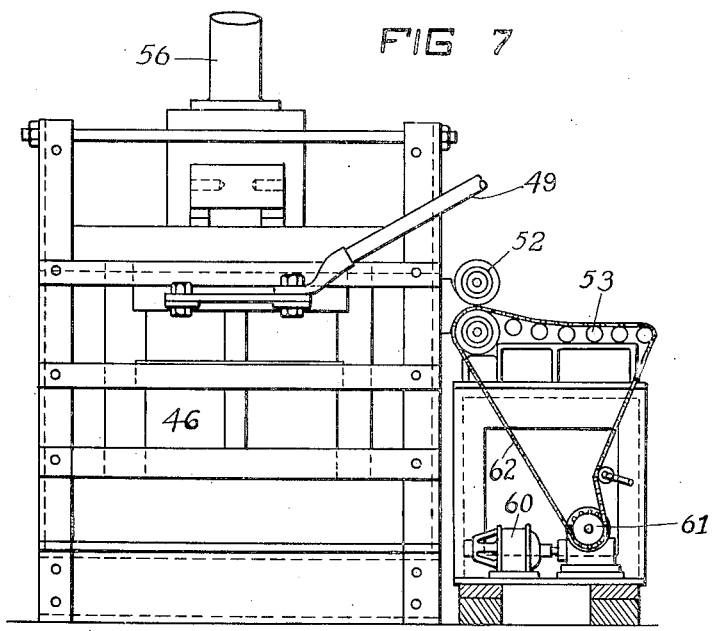

The invention relates to an apparatus for making glass and the like by the use of electricity as a melting and fining agency, the principal objects being to utilize the current so as to melt the batch and fine the glass economically; to produce large quantities of glass in a furnace of relatively small size; and to produce a product of high quality without discoloration incident to the contact of the glass with the electrodes. The tank is shown as applied to the making of sheet glass, and this is one large and important field of usefulness, but it will be understood that the invention is applicable to the melting and fining of glass without any limitation as to the form which the product is to assume. In its preferred form, the invention contemplates the use of an elongated tank with an enlargement or bay at each end in whose side or end walls the electrodes are located, the batch being fed into the tank between the bays or into the rear bay. The bays are of relatively large cross section, as compared with that of the melting section of the tank lying between them, so that the temperature of the molten glass contacting with the electrodes is relatively low as compared with that in the melting and fining sections of the tank. This reduces the tendency of the electrodes to discolor the glass due to the reaction between the electrodes and glass. In order still further to guard against discoloration of the glass from the electrodes, such members are made relatively large in their area of contact with the glass and provision is made to permit a rapid radiation of heat from their rear faces. Certain embodiments of the invention are illustrated in the accompanying drawings, wherein:

Figure 1 is a section on the line I—I of Fig. 2, showing one form of construction. Fig. 2 is a section on the line II—II of Fig. 1. Fig. 3 is an end elevation of the left hand end of the furnace. Fig. 4 is an end elevation of the right hand end of the furnace. Figs. 5, 6 and 7 show a modification, Fig. 5 being a section on the line V—V of Fig. 6, Fig. 6 being a section on the line VI—VI of Fig. 5, and Fig. 7 being an end elevation. And Fig. 8 is a horizontal section through another modified construction designed to be used with three-phase electric current.

Referring first to the construction of Figs. 1 to 4, the tank comprises a body portion 1 and a pair of bays 2 and 3, at the ends of the body portion, such bays extending transversely of the center line of the furnace and extending out past the sides of the body portion. The front wall 4 of the front bay 3 is provided with an outlet opening 5 and in opposition to this opening are the water cooled rolls 6 and 7, between which the ribbon or sheet of glass 8 may be withdrawn continuously over the rolls 9 and through a suitable leer. The rolls 6 and 7 have intermeshing spur gears 10 at their ends and one of these gears is driven from the tumbler shaft 11, such shaft being in turn driven from the motor 12 through the intermediary of the gears in the casing 13.

The side walls of the front bay 3 comprise the electrode plates 14, 14 connected to the terminal 15. Similarly, the rear wall of the rear bay 2 consists of the electrode plate 16 connected to the terminal 17. When current is supplied to the electrodes from a suitable source, it passes longitudinally of the tank from the electrode 16 to the electrodes 14, 14, the arrows shown in Fig. 1 indicating the direction of flow. These electrodes may be made of any suitable material having the requisite degree of refractoriness, such as a chromium iron alloy containing about 25 per cent of chromium. An alloy of this character has practically no discoloring effect upon the glass, if maintained at a temperature in the neighborhood of 1800 degrees F. In order to avoid too high a temperature due to the passage of the current, these plates are made of relatively large size. For the same reason, in order that the glass in the bays may not be heated to too high a temperature and so react upon the metal, the cross sectional area which carries the glass in these bays is made relatively large as compared with the cross sectional area in the body 1 of the tank. This permits the glass in the body 1 to be given a temperature high enough to melt and fine the glass without producing any temperature in the bays sufficient to react with the metal of the electrodes. With proper proportions of the bays as compared to the body 1, temperatures of 2700 to 2900 degrees F. may be easily secured in the body portion of the tank without a rise in temperature in the glass of the bays above a temperature of 1900 degrees. In order to still further promote the cooling of the electrodes 14, 14 and 16, the outer sides are exposed directly to the atmosphere by the use of the windows or openings 18, 18, 18, etc., the plates being supported by metal frameworks 19 and 20 carrying the refractory lining material 21 and 22.

In order that certain parts of the electrode plates may not be overheated, the vertical baffle members 23, 24 and 25 are provided, such baffle members extending vertically through the glass in the bays. It is opposite these baffles that the plates have a tendency to overheat and experience has demonstrated that the use of these baffles remedies this condition. In order to still further increase the cross sectional area of the rear bay 2 as compared with the body portion 1, the bay is made deeper than the rear part of the body portion. This difference in depth is secured by the use of the block 26 (Fig. 2), which very substantially reduces the cross sectional area of the melting portion of the tank, so that the heating effect of the current in this portion of the tank is greater. This decrease in cross sectional area is also desirable since the batch which comes into this portion of the furnace has a lower degree of conductivity than the molten glass further forward in the furnace, thus calling for a greater volume of current per unit of cross sectional area. For the same reason, the tank is made of the tapering cross section, shown in Fig. 1, thus giving greater heating effect at the rear end where the melting occurs.

The batch to be melted is fed into the furnace continuously through the feed pipe 27, the location of the lower end of which is indicated by dotted lines in Fig. 1. Batch is supplied to this pipe by means of the screw 28 extending past the lower end of the batch hopper 29. The screw is driven from the motor 30 through the intermediary of suitable reduction gearing in the casing 31. Extending upward above the screw 28 and the pipe 27 is the vent pipe 32 having the cover 33 mounted to swing about the pivot 34 and held in adjusted position by means of the rack 35. The reduction of the batch results in the freeing of large quantities of gas to the vent pipe and provides for the escape of this gas and also permits the heating of the incoming batch, thus increasing the economy of operation. After the melting in the furnace is well under way, the batch is fed in through the pipe 27 at a rate corresponding to the withdrawal of glass at the front end of the furnace.

In order to assist in maintaining the desired degree of difference in temperature in different parts of the furnace, the five vertically movable curtain blocks 37, 38, 39, 40 and 41 are employed, the curtain blocks 37, 38 and 39 being arranged along the length of the furnace, as indicated in Fig. 2, while the blocks 40 and 41 extend down through the top wall of the front bay 3. These curtain blocks are supported by means of the masts or pillars 42 provided at their ends with the pulleys 43, over which the cables 44 having the counterweights 45 extend. The ends of the cables are secured to the curtain blocks and the counterweights balance the weight of these curtain blocks so that the curtain blocks stay in the position to which they are adjusted. This position is about as indicated in Fig. 2 with the lower ends of the blocks extending an inch or two into the glass. The various parts of the furnace lying above the body of glass are thus effectively sealed off from each other. This permits the temperature in the melting section A (Fig. 2) to be maintained much higher than the temperature in the bay 2 and also somewhat higher than the temperature in the fining section B. The use of the curtain block 39 also permits a lower temperature to be maintained in the settling section C of the furnace than in the fining section B, it being understood that the line of definition between the sections A, B and C is not sharp, but that there is a substantial difference in temperature in these various portions of the tank. The curtain blocks 40 and 41 assist materially in keeping the glass, which is adjacent the electrode plates 14, 14 at a lower temperature than would otherwise be possible, this being a desirable condition, as heretofore pointed out, in order to prevent discoloration of the glass due to a reaction with the material of the electrodes.

In operation, the batch is fed continuously through the feed pipe 27 and, due to its density and temperature, sinks into the molten glass of the tank when it strikes the surface of such glass. The temperature of the glass in this section A of the furnace is such that a violent boiling occurs and this action, combined with the addition of fresh batch, produces a circulation which greatly facilitates the incorporation of the new batch with the melted glass. This agitating and circulating effect is so vigourous that the glass is in condition for fining by the time it reaches the section B of the tank, the curtain block 38 serving to limit the boiling action to the section of the tank to the left thereof. Due to the withdrawal of the glass from the right hand end of the furnace, there is a constant flow of glass to the right through the chambers B and C and into the bay 3, and during this movement, the glass becomes fined and settled and reduced in temperature so that it is at a proper temperature for use when it passes the outlet slot 5.

Figs. 5, 6 and 7 illustrate a modification wherein the tank comprises the melting section 43ª lying between the bays 44ª and 45ª. These bays are similar in construction, being provided with the electrodes 46 and 47, connected to the terminals 48 and 49. The glass is in this case withdrawn through an opening 50 through the side wall of the bay instead of through the front wall as in the construction of Fig. 1. The glass, as thus withdrawn, passes between rolls 52 similar to those of the Fig. 1 construction and over a series of rolls 53 and into a leer. These rollers are driven from the motor 60 through the intermediary of the gearing 61 and the chain 62 (Fig. 7). A pair of vertical baffle members 54 and 55 are provided opposite the central portions of the electrodes 46 and 47. Batch is supplied through the pipe 56, and curtain blocks 57 and 58 are employed performing functions similar to those of the curtain blocks of the Fig. 1 construction. These curtain blocks are maintained at various positions of adjustment by the use of the adjusting blocks 59. This furnace is also designed to be used with single phase current.

Fig. 8 shows still another modification of the furnace construction designed to be used with three-phase current, this particular construction being shown and claimed in my copending application of even date, Serial Number 193,405. This furnace comprises a melting section 64 and the bays 65 and 66, the bay 65 being provided at its ends with the additional enlargements 67, 67. Vertically movable curtain blocks are provided at 68, 68 and batch is supplied vertically at 69, 69. The central portion of the bay 65 can, therefore, act as a melting chamber. The end walls of the bays 65 and 66 are provided with the electrode plates 70, 71, 72 and 73. The electrodes 72 and 73 are connected to the same terminal 74, but the electrodes 70 and 71 are connected to different terminals 75 and 76 of the three-phase circuit. The baffles 77, 77 and 78, 78 as used in this construction are circular in cross section, instead of square. Three additional curtain blocks, 79, 80 and 81 are employed at the front bay, the functions of these curtain blocks being the same as those of the curtain blocks 39, 40 and 41 of the Fig. 1 construction. Glass is withdrawn from the front side of the bay 66 through the slot 82 and between the rolls 83, the glass being then delivered over the apron rolls 84 and into a leer as in the other types of construction.

The tank and associated apparatus is suitable for the reduction of vitreous products other than those commonly referred to as glass, such as the vitreous enamels, which are a species of glass, and silicate of soda, which is sometimes referred to as soluble glass. It will be understood, therefore, that the term "glass" is used in its broad sense and that the furnace is not limited to use in the melting of the ordinary forms of glass.

What I claim is:

1. In combination in apparatus for melting glass, a tank, a metal plate electrode constituting one of the walls thereof and exposed to the atmosphere on its rear face, a second electrode for transmitting current to the glass in the tank at a point remote from said plate, and means for supplying a current of electricity to said electrodes, said plate having its area of contact with the glass relatively large in proportion to its thickness.

2. In combination in apparatus for melting glass, a tank, a metal plate electrode constituting one of the walls thereof and exposed in part to the atmosphere on its rear face, a second electrode for transmitting current to the glass in the tank at a point remote from said plate, and means for supplying a current of electricity to said electrodes, said plate being of a length and width relatively great as compared with its thickness.

3. In apparatus for melting glass, a glass containing tank, a plurality of plate electrodes, means for passing current between the electrodes through the material contained in the tank, said tank being so shaped that current passing between said electrodes is concentrated at a location remote from said electrodes, the inner surfaces of said electrodes forming walls of said tank and having portions extending above the normal glass level of said tank and other portions extending below said glass level, and their outer surfaces forming the outer wall of said tank with a major portion thereof exposed to the atmosphere, whereby said electrodes are maintained at such a temperature that they will not discolor the glass.

4. In apparatus for melting glass, a tank, plate electrodes therein, said electrodes forming a substantial portion of the walls of said tank and discoloring glass at the temperature at which glass forming material is melted into glass, and means for maintaining said electrodes at a temperature below that at which they discolor glass, while raising the temperature of the glass forming materials to a point at which they form glass by passing a current of electricity between the electrodes.

5. In apparatus for making glass, a tank, a plate electrode forming a section of the wall of said tank having one of its two large surfaces exposed to the interior of the tank both above and below the level of the glass therein and the other of its two large surfaces exposed to the atmosphere outside the tank, another electrode spaced from said first electrode, and means for passing a current of electricity through the glass between the electrodes.

6. In combination, in apparatus for melting glass, a tank, a metal plate electrode constituting one of the walls thereof and exposed to the atmosphere on its rear face, a second electrode for transmitting current to the glass in the tank at a point remote from said plate, at least one of said electrodes being composed of an alloy of iron and chromium, and means for supplying a current of electricity to said electrodes, said plate having its area of contact with the glass relatively large in proportion to its thickness.

7. In apparatus for making glass, a tank, a metal plate electrode constituting one of the walls thereof, a second electrode remote from said first electrode, means for passing a current between said electrodes, means for concentrating said current in predetermined parts of said tank distant from the electrodes, whereby the glass therein is heated to a relatively higher temperature than glass in the portions of said tank where such concentration does not occur, and means to shut off the vapors and heat arising from said areas of concentration from said electrodes.

8. In apparatus for melting glass, a tank, a metal plate electrode constituting one of the walls thereof and having a portion of its interior surface above the level of glass in said tank and a portion submerged in the glass in said tank, and having its exterior surface exposed to the atmosphere whereby the upper surface of said electrode is maintained relatively cool, a second electrode, means for passing a current between said electrodes, means for concentrating said current at a point remote from said plate electrode, and means for shutting off the air within the tank coming in contact with the relatively cool upper portion of said plate electrode from the air above that portion of the tank in which said current is concentrated.

9. In apparatus for melting glass, a tank, a metal plate electrode constituting one of the walls thereof, said electrode being in contact with the glass on its inner surface and in contact with the air on its outer surface, and means for supporting said electrode intermediate its ends by a support of relatively small area as compared with the size of said electrode.

In testimony whereof, I have hereunto subscribed my name this 21st day of May, 1927.

HARRY F. HITNER.